United States Patent [19]

Tiedemann, Jr. et al.

[11] Patent Number: 5,392,287

[45] Date of Patent: Feb. 21, 1995

[54] APPARATUS AND METHOD FOR REDUCING POWER CONSUMPTION IN A MOBILE COMMUNICATIONS RECEIVER

[75] Inventors: Edward G. Tiedemann, Jr.; Lindsay A. Weaver, Jr.; Richard J. Kerr, all of San Diego; Kenneth M. Geib, Encinitas, all of Calif.

[73] Assignee: Qualcomm Incorporated, San Diego, Calif.

[21] Appl. No.: 847,149

[22] Filed: Mar. 5, 1992

[51] Int. Cl.⁶ ............................................. H04J 3/04
[52] U.S. Cl. ................................ 370/95.1; 455/38.3; 455/343
[58] Field of Search ............... 370/95.1, 95.2, 95.3, 370/50, 105.1, 94.1, 100.1, 103, 105.1, 85.2; 455/33.1, 33.4, 33.2, 33.3, 56.1, 34.1, 34.2, 38.3, 13.4, 343, 89; 379/60, 63, 59, 343

[56] References Cited

U.S. PATENT DOCUMENTS

| | | | |
|---|---|---|---|
| 4,866,709 | 9/1989 | West et al. | 370/95.1 |
| 5,040,172 | 8/1991 | Mano et al. | 370/95.1 |
| 5,159,596 | 10/1992 | Itoh | 370/95.1 |
| 5,175,874 | 12/1992 | Auchter | 455/89 |

*Primary Examiner*—Douglas W. Olms
*Assistant Examiner*—Dang Ton

*Attorney, Agent, or Firm*—Russell B. Miller; Katherine W. White

[57] ABSTRACT

A system for reducing receiver power consumption in communication system having a transmitter and one or more receivers schedules periodic messages in "slots." Each receiver is assigned a slot during which it monitors the transmissions. The transmitter transmits messages to the receiver only during the assigned slots. The receiver is in an "active state" during its assigned slot. It may remain in the active state after its assigned slot if the message requires the receiver to perform additional actions. During the "inactive state," which is the time period between successive occurrences of its assigned slot, the receiver may perform any action not requiring coordination with the transmitter. It may conserve power during this time by removing power from one or more components such as those used for monitoring the transmissions. At a time during the inactive state shortly before the assigned slot, the receiver applies power to these components and performs initializations. Such initializations may include requiring a pilot channel signal to which the receiver may synchronize itself if its timing signals have drifted out of synchronization with those of the transmitter during the preceding inactive state.

48 Claims, 6 Drawing Sheets

APPARATUS AND METHOD FOR REDUCING POWER CONSUMPTION IN A MOBILE COMMUNICATIONS RECEIVER

BACKGROUND OF THE INVENTION

The present invention relates to mobile communications systems such as cellular telephone systems and, more specifically, to a system for reducing power consumption in a mobile or portable transceiver of such a system.

In many communications systems, the transceivers are only sporadically active. For example, a cellular telephone remains idle for significant periods of time when no call is in progress. During such idle periods the cellular telephone consumes substantially the same amount of power as during active periods. However, to ensure that a transceiver receives sporadically transmitted messages, it must continuously monitor a channel. In a digital cellular telephone system, such as that described in U.S. Pat. No. 5,056,031 entitled "Method and Apparatus for Controlling Transmission Power in a CDMA Cellular Telephone System" and copending U.S. patent application Ser. No. 07/543,496, now abandoned, entitled "System and Method for Generating Signal Waveforms in a CDMA Cellular Telephone System," both assigned to the assignee of the present invention, messages transmitted by a base station may include those for alerting the mobile station to the presence of an incoming call and those for periodically updating system parameters in the mobile station.

While a mobile station installed in a vehicle may be powered by the vehicle's electrical system, prolonged use of the mobile station when the vehicle is not operating may drain the vehicle's battery. Furthermore, many mobile stations are portable and powered by an internal battery. Personal Communications Systems (PCS) handsets are almost exclusively battery powered. In any such stations it is desirable to minimize power consumption to increase battery life.

A mobile station may consume significant amounts of power by continuously monitoring the channel for incoming messages. The resulting power drain on the battery reduces the time available for actively handling calls. A system that reduces power consumption by periodically monitoring the channel for incoming messages during idle periods would be highly desirable. These problems and deficiencies are clearly felt in the art and are solved by the present invention in the manner described below.

SUMMARY OF THE INVENTION

The present invention reduces receiver power consumption in a communication system having a transmitter communicating with one or more remote receivers on a channel. Each receiver periodically enters an "active state" during which it can receive messages on the channel. The transmitter sends one or more messages to each receiver during each successive occurrence of the active state of the receiver. Although we generally refer herein to a single receiver, it is understood that more than one such receiver in a system may be active simultaneously. During the "inactive state" of a receiver, the time period between successive active states, the transmitter does not send any messages to that receiver, although it may send messages to other receivers in the system that are in the active state. In the inactive state, the receiver may perform any action not requiring coordination with the transmitter. The receiver may use the inactive state to reduce its power consumption by removing power from one or more components, such as those components used for monitoring the channel.

The channel is divided in the time dimension into a continuous stream of "slots." The receiver has a "slot cycle," which comprises two or more slots. The receiver is assigned one slot of its slot cycle during which it must monitor the channel. The receiver is generally in the active state only during its assigned slot and in the inactive state during the remainder of its slot cycle. However, if the message itself directs the receiver to perform some further action, it must remain in the active state until it completes the action.

The transmitter and receiver slot timing should be aligned in the time dimension to ensure that transmitted messages are not lost but are received in the assigned slot. In certain embodiments, the transmitter and receiver slot timing may be continuously synchronized. However, in other embodiments, the receiver may operate independently during the inactive state and some timing drift may occur relative to the transmitter. In such embodiments, the receiver may periodically synchronize its slot timing to that of the transmitter.

In a digital cellular telephone system, for example, the receiver may acquire and track a pilot signal that the transmitter provides on a separate pilot channel. In the inactive state, the receiver may conserve power by removing power from the pilot signal tracking circuitry during the inactive state. In the inactive state, the receiver may maintain its slot timing using an internal clock source. A short time before the next occurrence of its assigned slot, the receiver may apply power to this circuitry and require the pilot signal. The receiver may then realign its timing with that of the transmitter by synchronizing it to the pilot signal. In addition to applying power and requiring a pilot signal, the receiver may perform any other actions or initializations to prepare it to receive a message at the beginning of its assigned slot.

Each message may also contain a field indicating whether another message is forthcoming. If an additional message is forthcoming, the receiver remains in the active state into the next slot. If there are no additional messages, the receiver may immediately enter the inactive state for the remainder of the slot cycle.

In a system having multiple receivers, each receiver is pseudorandomly assigned a slot in its slot cycle. An identification number uniquely associated with the receiver may be provided to a hash function, which pseudorandomly produces the assigned slot number.

All receivers in the system need not have the same slot cycle. Furthermore, the slot cycle of a receiver may change during operation. For example, the receiver may select a new slot cycle and send a message to the transmitter notifying it of the new slot cycle. Although either the receiver or transmitter may change the slot cycle of the receiver, both must have the slot cycle information.

The foregoing, together with other features and advantages of the present invention, will become more apparent when referring to the following specification, claims, and accompanying drawings.

BRIEF DESCRIPTION OF THE DRAWINGS

For a more complete understanding of our invention, we now refer to the following detailed description of the embodiments illustrated in the accompanying drawings, wherein:

FIGS. 2(a-d) illustrate the timing relationship between transmitter slot signals and receiver slot signals at successive points in time;

DESCRIPTION OF THE PREFERRED EMBODIMENTS

Figure 1:
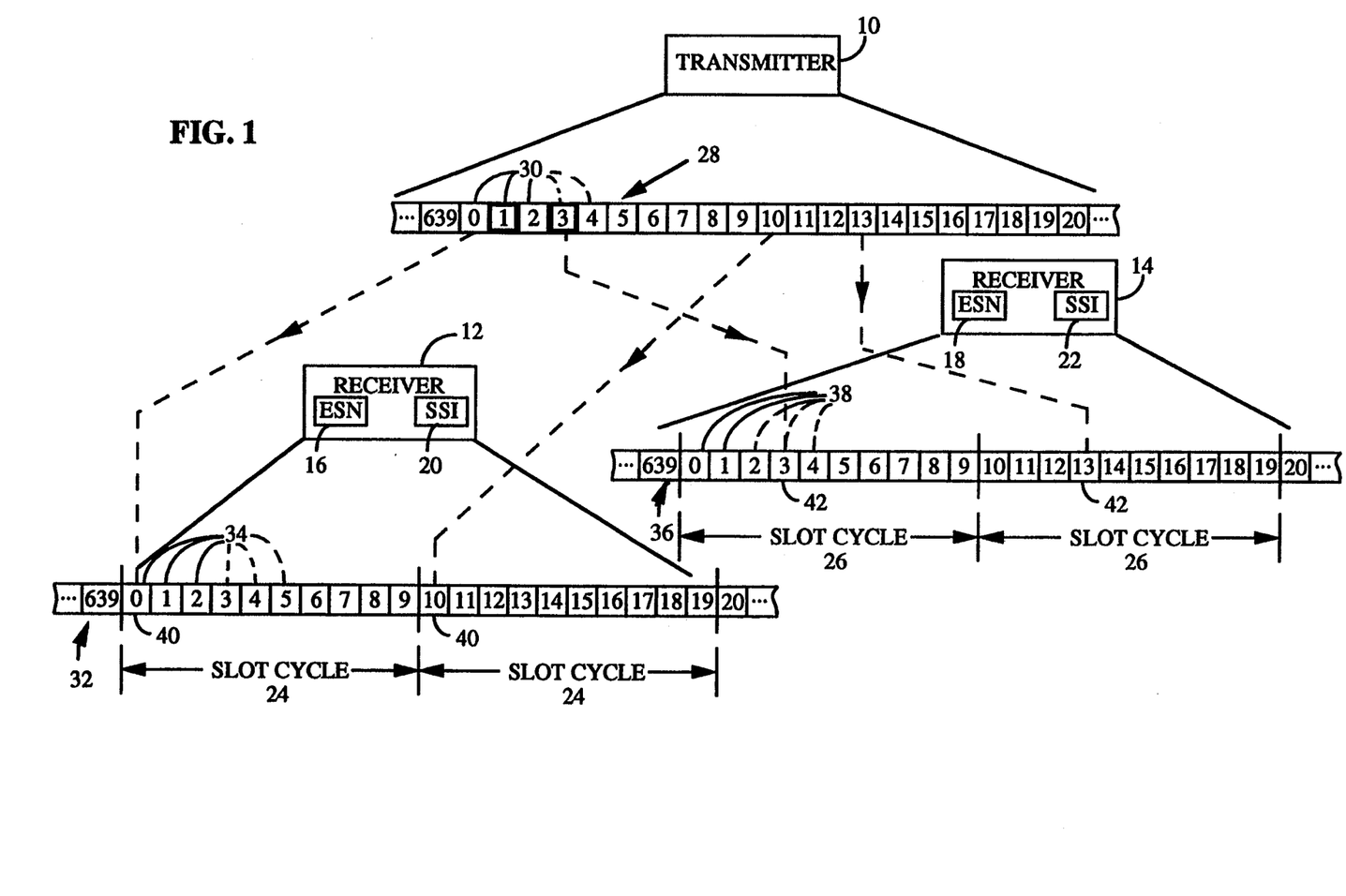
FIG. 1 illustrates the slotted transmission of messages in an embodiment of the present invention having a transmitter and two receivers.

In FIG. 1, a transmitter 10 may send messages to two receivers 12 and 14. Other embodiments may have a greater or lesser number of receivers. In a digital cellular telephone system such as discussed in the above-referenced U.S. Patent and copending application, transmitter 10 is disposed in a base station or cell site (not shown) and transmits messages to receivers 12 and 14, disposed in mobile stations (not shown). The mobile stations may be cellular telephones or personal communications system (PCS) handsets.

The base station transmits these messages, which may provide the mobile station with an indication of an incoming telephone call, with a requirement to take special control actions, or with updated system parameters, on a "paging" channel. The paging channel transmissions are represented by the broken lines in FIG. 1.

Receivers 12 and 14 have 32-bit electronic serial numbers (ESN) 16 and 18, respectively. The ESN of each receiver is different from that of all other receivers. In a cellular telephone system, a call to a cellular telephone is routed to a mobile telephone switching office (MTSO, not shown). The MTSO in turn routes the call to a base station within transmitting range of the mobile station. Either the MTSO or the base station includes means for converting the telephone number of the cellular telephone into the mobile station ESN.

During a mobile station initialization or "registration" as it is known in the cellular communications art, or at other times as required, receivers 12 and 14 each select a slot cycle index 20 and 22 respectively. Slot cycle indices 20 and 22 determine the length of the slot cycles 24 and 26 of receivers 12 and 14 respectively. A processor in a mobile station may select a slot cycle index using an algorithm or it may use a predetermined value. For example, both slot cycle indices 20 and 22 have the value "1" in FIG. 1. A range of 1-7 is preferred for slot cycle indices 20 and 22. Thus, the maximum slot cycle index, $MAX_{13}$ SSI is "7." A value of "0" may be chosen to indicate that a receiver will continuously monitor the channel, i.e., the slotted communication method of the present invention will be bypassed. In a cellular telephone system, each mobile station transmits the slot cycle index selected by its receiver to the base station, which requires this information to access the receivers.

Receivers 12 and 14 compute slot cycles 24 and 26, which are $5 \times 2^{(slot\ cycle\ index\ 20)}$ and $5 \times 2^{(slot\ cycle\ index\ 22)}$ slots in length respectively. Transmitter 10 generates timing 28, which comprises a stream of periodic slots 30. Similarly, receiver 12 generates timing 32, which comprises a stream of periodic slots 34, and receiver 14 generates timing 36, which comprises a stream of periodic slots 38. Slots 30, 34, and 38 are equal in length and are preferably 200 milliseconds (ms) in length. Thus, using a range of slot cycle indices of 1-7 in the above function yields a range of slot cycles of between 10 and 640 slots in length, which corresponds to a time range of between 2 and 128 seconds using 200 ms slots.

Receiver 12 monitors the channel during an active slot 40, which occurs once in each slot cycle 24. Receiver 14 monitors the channel during an active slot 42, which occurs once in each slot cycle 26. Assigned slots are pseudorandomly selected to facilitate their even distribution among the slots of a slot cycle having a given length. Although many pseudorandom methods for selecting assigned slots are suitable, a method using Equations 1 and 2, below, is preferred.

Equations 1 and 2 may be used by transmitter 10 and receivers 12 and 14 to determine the periodic points in time, relative to "system time," at which assigned slots occur. At the beginning of system time, the first slot ($slot_0$) of each possible slot cycle occurred simultaneously. System time may be the current value of a counter (not shown) in each transmitter 10 and receiver 12 and 14. Such a counter (not shown) can run for thousands of years without repeating if it has a sufficiently large number of bits, and can easily be constructed by one skilled in the art. In addition, transmitter 10 may synchronize its counter (not shown) to a universal broadcast time source, such as that produced by the Global Positioning System (GPS). Receivers 12 and 14 synchronize their counters (not shown) to that of transmitter 10, as discussed below.

$$\text{PGSLOT} = \lfloor 52^{MAX\_SSI} \times ((40503 \times (L \oplus H \oplus D))\bmod 2^{16})/2^{16} \rfloor \quad (1)$$

where:

$MAX_{13}$ SSI is the maximum slot cycle index;

L is the least significant 16 bits of the ESN;

H is the most significant 16 bits of the ESN;

D is a number 6 times the least significant 12 bits of the ESN;

$\lfloor X \rfloor$ represents the largest integer less than or equal to X ; $\oplus$ represents a bitwise exclusive-OR operation; and all other operations are integer arithmetic.

Equation 1 may be solved for PGSLOT, which represents the time at which the assigned slot occurs as measured from the beginning of the slot cycle of maximum length. Equation 2, below, relates this time to system time. Receiver 12 uses ESN 16 to calculate its PGSLOT and receiver 14 uses ESN 18. Note that PGSLOT has a maximum value of $5 \times 2^{MAX\_SSI}$ slots ($2^{MAX\_SSI}$ seconds). However, receivers 12 and 14 may choose shorter slot cycles, as exemplified by FIG. 1 where both slot cycle 24 and 26 are 10 slots (2 seconds) in length.

Active slots 40 and 42 occur periodically within slot cycles 24 and 26, respectively. Equation 2 below may be used to determine when active slots 40 and 42 occur relative to system time.

$$(N-\text{PGSLOT})\bmod(5 \times 2^{SSI}) = 0 \quad (2)$$

In Equation 2, N is the current slot. As discussed above, the first slot of all possible slot cycles occurs at the beginning of system time, i.e., when N equals zero. Receivers 12 and 14 each substitute slot cycle indices 20 and 22 respectively for SSI in Equation 2. The value of PGSLOT is also unique to each receiver 12 and 14 because it is derived from ESN 16 and 18, respectively. Receivers 12 and 14 each may compute Equation 2 once each slot cycle and, if true, monitor the channel for incoming messages because the current slot is active slot 40 or 42, respectively. Of course, receivers 12 and 14 need not compute Equation 2 each slot cycle. Receivers 12 and 14 may compute Equation 2 at some initial point in time and, upon Equation 2 being true, may thereafter monitor the channel periodically at intervals of slot cycle 24 and slot cycle 26.

The computations discussed above in reference to mobile station receivers 12 and 14 are also performed by base station transmitter 10. For example, when a caller dials a telephone number associated with a mobile station, the MTSO routes the call to a base station in the vicinity of the mobile station. The base station retrieves the ESN and slot cycle of the mobile station by providing a lookup table with the telephone number. The base station computes the assigned slot in which it must transmit to the mobile station using Equations 1 and 2. When the base station slot timing generates the assigned slot, the transmitter sends a message that indicates the presence of an incoming call to the mobile station.

When mobile station receiver 12, for example, selects slot cycle index 20, it transmits the value selected to the base station on another channel (not shown). The base station acknowledges the selection by transmitting an acknowledgement message to mobile station receiver 12. Transmitter 10 begins using the newly selected slot cycle index after transmitting the acknowledgement. However, if receiver 12 does not receive such an acknowledgement because of a transmission error, receiver 12 will continue to use the old slot cycle index. Messages may be lost if transmitter 10 does not compute the active slots of receiver 12 using the same slot cycle index that receiver 12 uses to compute its active slot. To facilitate recovery from such an error, receiver 12 selects a default slot cycle index of "1" if it does not receive an acknowledgement. A slot cycle index of "1" ensures that an active slot as computed by transmitter 10 will coincide with an assigned slot as computed by receiver 12. Actually all that is required is that the receiver uses a slot cycle index less than or equal to that of the transmitter for the slots to line up.

Slot timing 28 of base station transmitter 10 is synchronized to slot timing 32 during transmission of messages to mobile station receiver 12 and to slot timing 36 during transmission of messages to mobile station receiver 14. Transmitter 10 synchronizes slot timing 28 to its system time counter (not shown).

The timing relationship between a base station transmitter and a mobile station receiver is shown in FIGS. 2a–2d. FIGS. 2a–2d represent successive "snapshots" in time and show a portion of the transmitter and receiver signals at these successive points in time. Note that the arrow 72 is simply a fixed point in time that serves as a common reference point for facilitating comparison of the signals throughout FIGS. 2a–2d. The signals can be thought of as moving in time from left to right towards arrow 72, as though on conveyor belts.

Figure 2A:
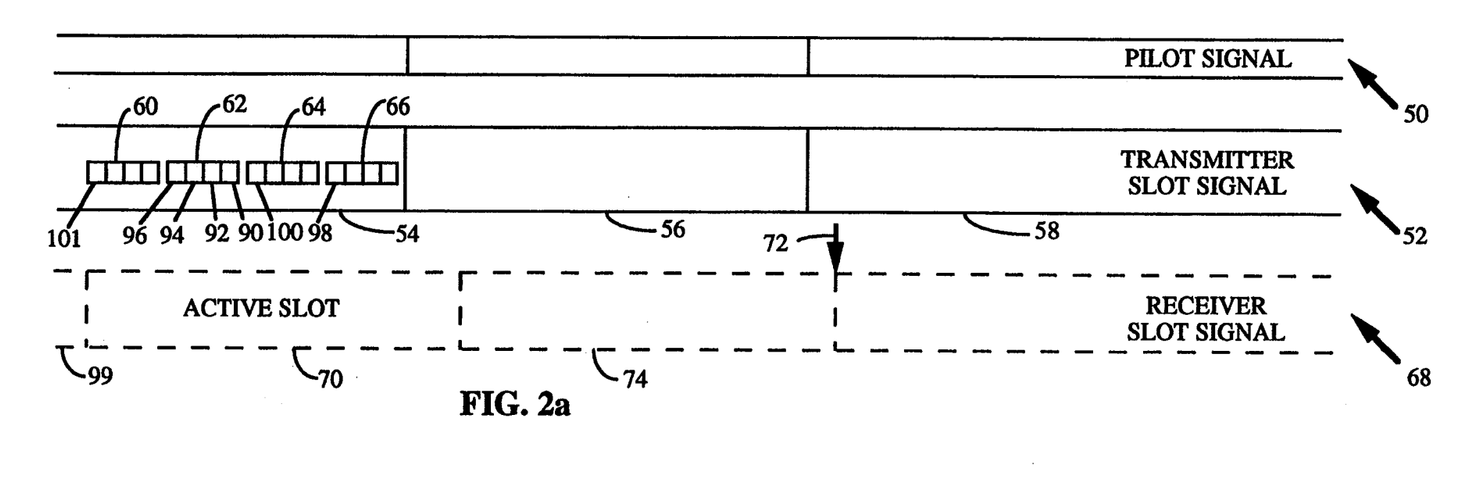

In FIG. 2a, a base station transmitter, such as base station transmitter 10 of FIG. 1, transmits a pilot signal 50, synchronized to the system clock, on a separate pilot channel. Base station transmitter 10 synchronizes transmitter slot signal 52, which has slots 54, 56, and 58, to pilot signal 50. Although pilot signal 50 is shown as having the same period as slots 54, 56, and 58, it may be any type of signal from which such a periodic signal could be derived. Slot 54 has messages 60, 62, 64, and 66. Although at least one message must be transmitted in each slot, the maximum number of messages that may be transmitted in a slot is limited only by the transmission rate and slot length.

FIG. 2a shows the signals at a point in time during which the receiver is in the inactive state. Receiver slot signal 68 is shown in broken lines to represent the inactive state because in the inactive state the receiver may conserve power by removing power from circuitry (not shown) that monitors the channel for messages. It may also remove power from circuitry (not shown) that tracks pilot signal 50. It is emphasized that the receiver may perform any action in the inactive state that does not require coordination with the transmitter.

As shown in FIG. 2a, receiver slot signal 68 may not be precisely aligned with transmitter slot signal 52 because in the inactive state the receiver is not tracking pilot signal 50 to which it could otherwise synchronize slot signal 68. However, the maximum time by which these signals may drift apart is substantially less than one slot.

Slot 70 is the active slot of the receiver and may correspond to active slot 40 or 42 of FIG. 1. The transmitter will send a message at the point in time when the first message, message 66, reaches arrow 72. The transmitter timing may determine this point by counting slots of the slot cycles from the beginning of system time. For example, slot zero occurred for the first time at the beginning of system time and repeats with a periodicity of the slot cycle. Although the receiver timing may have drifted slightly from the transmitter timing during the preceding inactive state, they are synchronized long before the occurrence of the next slot. Typically the drift is only about 2 microseconds for a receiver using a slot cycle of 2 seconds. Therefore, the receiver can determine the point in time at which it may expect to receive a message, i.e., arrow 72, with a precision well within a single slot. It can thus begin to transition to the active state shortly before this occurrence.

Figure 2B:
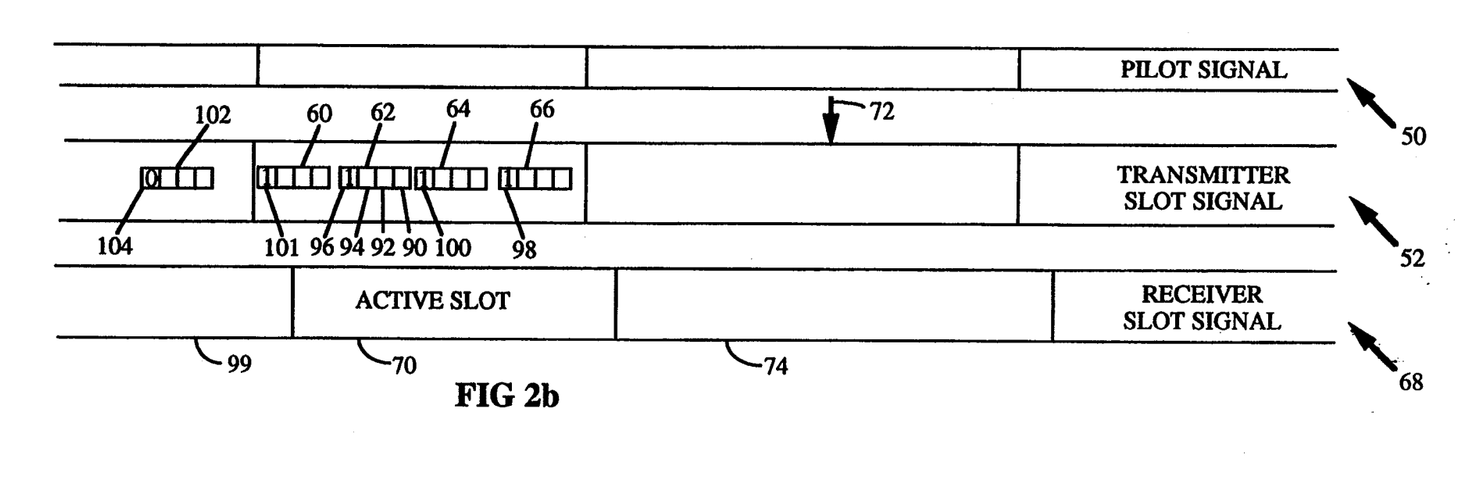
Figure 2C:
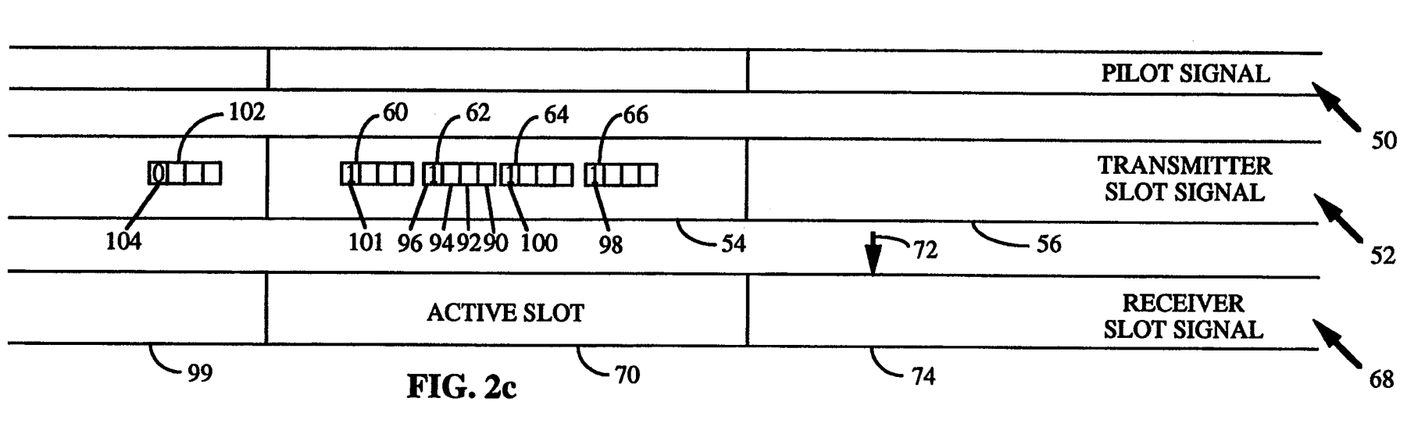

FIG. 2b shows the same signals at a point in time later than that of FIG. 2a. At a point in time between that of FIG. 2a and that of FIG. 2b, the receiver began the transition to the active state and applied power to the circuitry that tracks pilot signal 50. It is preferred that the transition begin after the beginning of slot 74, the slot preceding active slot 70, has reached arrow 72. However, the transition may begin at an earlier time. During the transition state, the receiver may apply power to circuitry, perform hardware resets, perform initialization routines, require pilot signal 50, synchronize signals, or perform any action necessary to prepare it to receive messages in active slot 70 at arrow 72.

Figure 4:
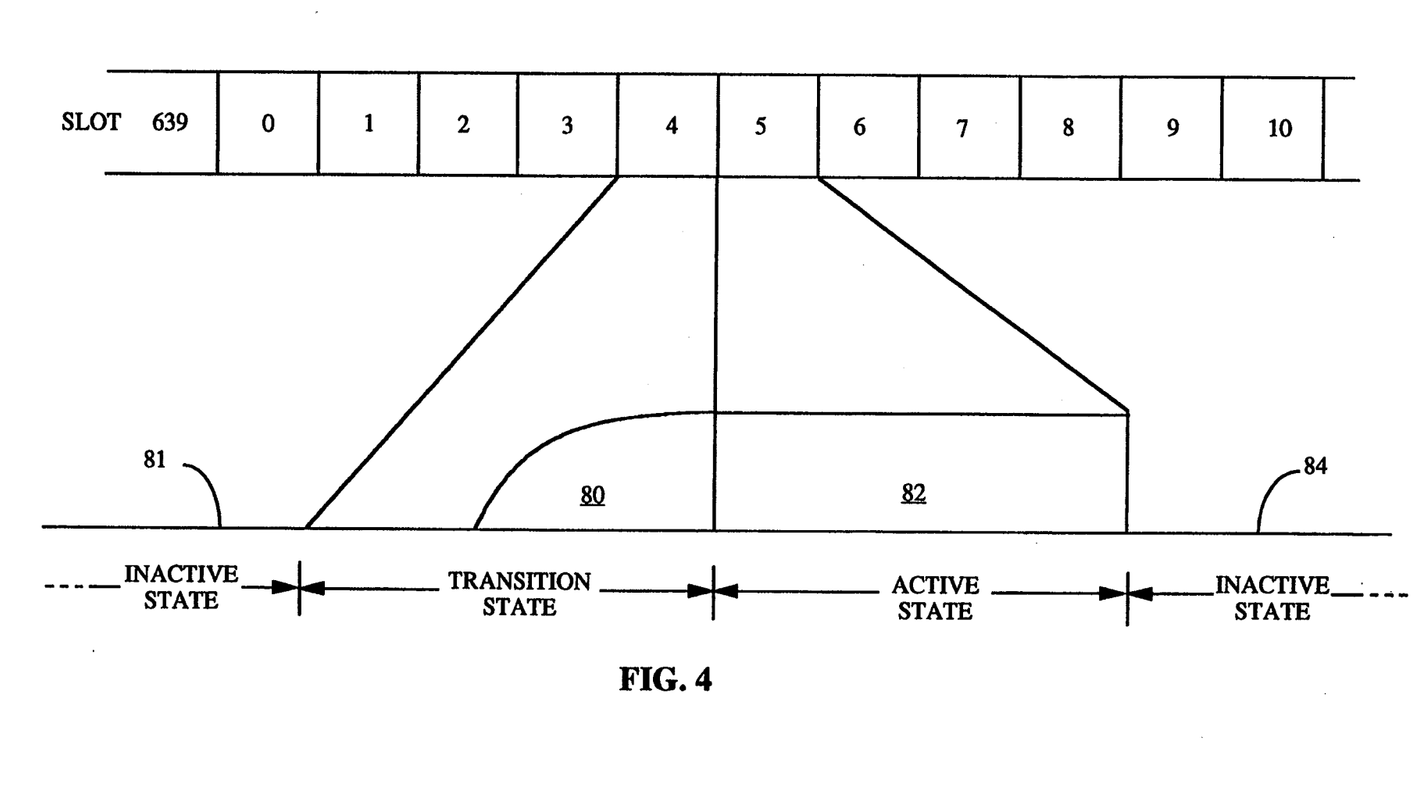
FIG. 4 illustrates the transition from the inactive state to the active state at the assigned slot of a receiver; and FIGS. =(a-b)illustrate a message having a sequence number field.

The transition state 80 is shown in FIG. 4 beginning in $slot_4$, the slot preceding the active slot, $slot_5$. The receiver is in the inactive state 81 before this time. During $slot_5$, the receiver in is the active state 82, and returns to inactive state 84 at the end of $slot_5$. In the absence of conditions discussed below, a receiver is in the active state only during its active slot.

Returning to FIG. 2c, which shows the signals at a point in time later than that of FIG. 2b, receiver slot signal 68 is completely synchronized to transmitter slot signal 52. The receiver has re acquired and is tracking pilot signal 50. The receiver is in the active state because it is prepared to receive a message in active slot 70 at arrow 72.

Figure 2D:
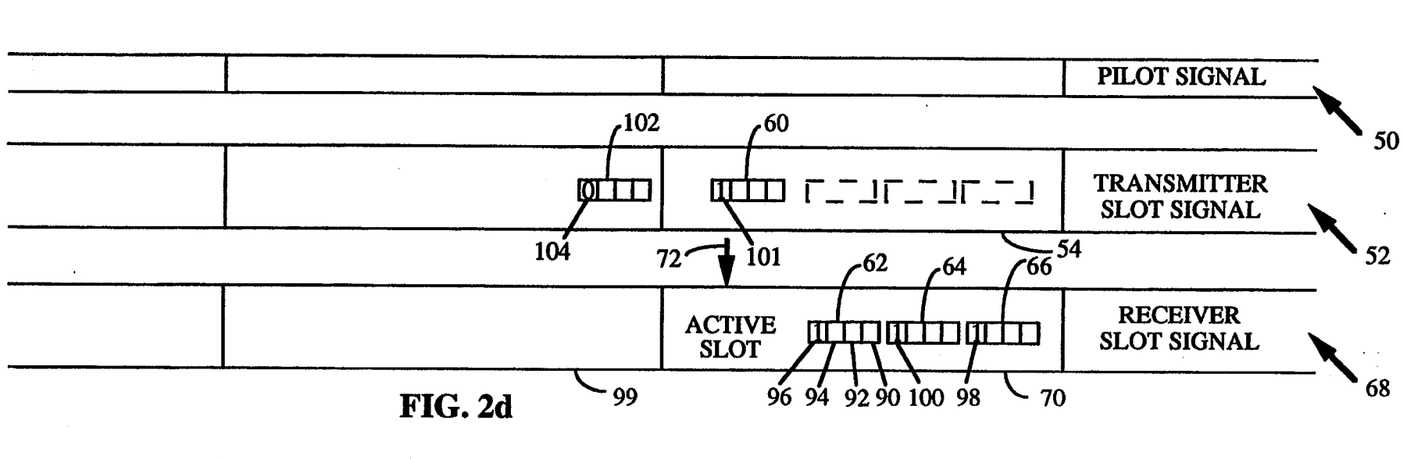

At the point in time represented by FIG. 2d, the receiver is receiving message 60. It has already received messages 62, 64, and 66. Each message may have several fields, for example, fields 90, 92, 94, and 96 of message 62. The fields contain the address of the receiver and instructions for the receiver. The field may contain system parameters for use by the receiver. Alternatively, the message field may contain the phone number when the transmitter is "paging" the receiver. The receiver decodes each message and may perform one or more actions according to the values contained in the fields.

Figure 3:
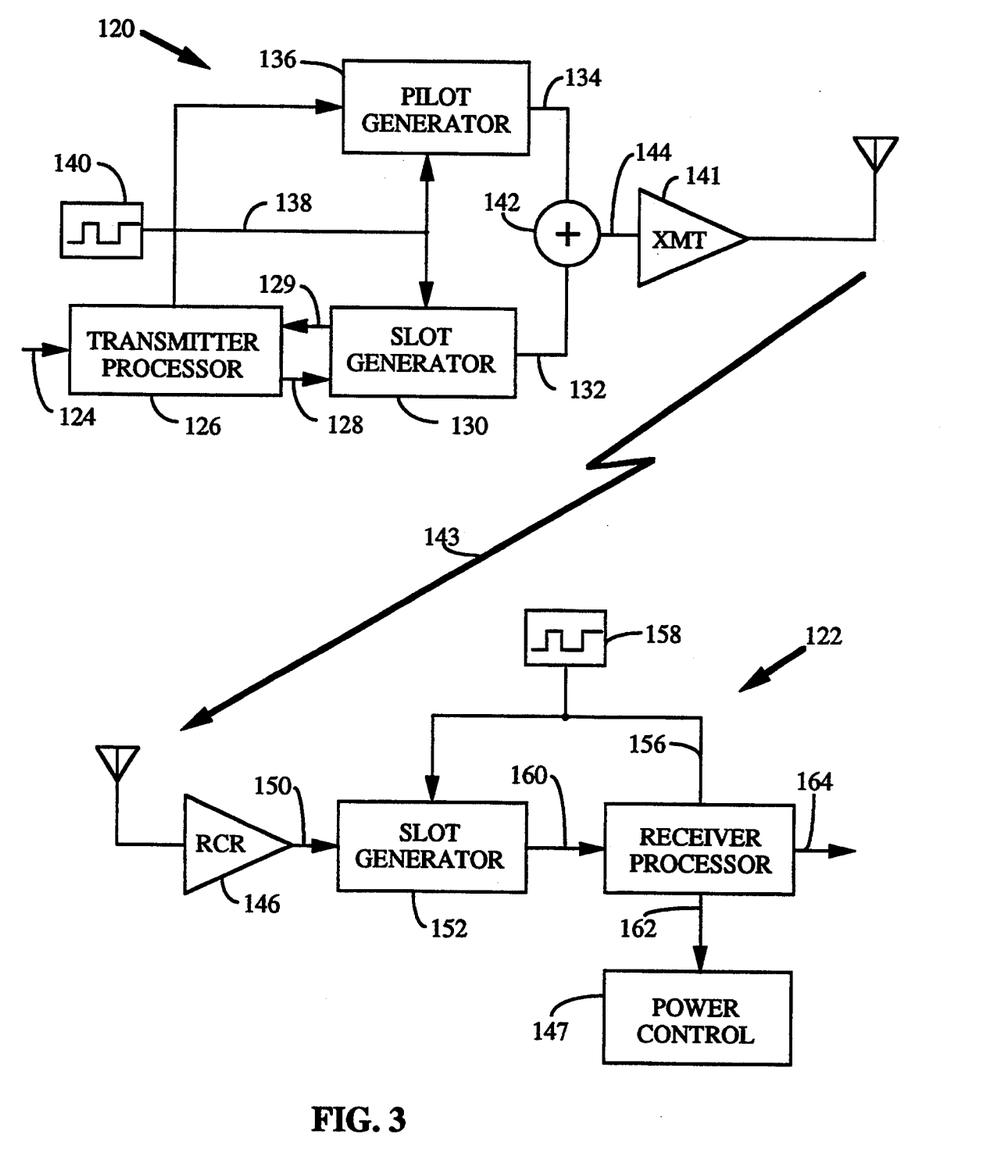
FIG. 3 illustrates an embodiment of the present invention having a message channel and a pilot channel.

FIG. 3 shows a block diagram of a system for generating the signals described in FIGS. 2a–2d. The system comprises base station transmitter 120 and mobile station receiver 122. A user (not shown) may, for example, initiate a call to the mobile station having receiver 122. In a cellular telephone system, such a call is received at the MTSO (not shown) and includes the telephone number of the mobile station being called. The MTSO routes the call to a base station. The MTSO obtains the mobile station ESN and slot cycle in response to the telephone number of the mobile station. The MTSO then provides the base station with input information 124, which includes the ESN and slot cycle of the mobile station. Information 124 is received by the transmitter processor 126, which may be a microprocessor or other control circuitry. Processor 126 may use the hash function of Equations 1 above to obtain the assigned slot of the mobile station.

Transmitter slot signal generator 130 generates an active slot signal 129, which may interrupt processor 126 when processor 126 must provide messages 128, i.e., a short time before the active slot. Transmitter slot signal generator 130 may have a counter for maintaining a slot count. Alternatively, the count may be maintained by processor 126. Transmitter slot signal generator 130 synchronizes messages 128 to the system clock 138, which is generated by transmitter clock source 140. Pilot signal generator 136 generates pilot signal 134, which is also synchronized to system clock 138. Summer 142 adds pilot signal 134 to synchronized message signal 132 and provides the sum signal 144 to a paging channel transmitter 141. Paging channel transmitter 141 broadcasts the transmitted messages 143.

In the mobile station receiver 122, paging channel receiver 146 receives transmitted messages 143. In the inactive mode, the power controller 147 may remove power from one or more components, such as receiver 146. Received message signal 150 is provided to receiver slot signal generator 152. In the inactive mode, receiver slot signal generator 152 maintains the slot count in synchronization with local clock signal 156, which is generated by receiver clock source 158. In the active mode, receiver slot signal generator 152 extracts the messages and pilot signal from received message signal 150 and provides synchronized messages 160 in synchronization with the pilot signal. Synchronized messages 160 are provided to processor 162. Processor 162 provides output signals 164 in response to the messages. Signals 164 alert the mobile station to the type of action it must perform. For example, the mobile station may activate a "traffic" channel for conducting subsequent voice communication in response to signals 164 that alert it to the presence of an incoming call.

Each message may have a MORE_PAGES field, which indicates to the receiver whether an additional message will be transmitted following the current message. A zero in this field indicates that there are no additional messages. If the receiver decodes a zero in the MORE_PAGES field, it may then immediately enter the inactive state without waiting until the end of the current slot. If the message has a nonzero value in the MORE_PAGES field, the receiver remains in the active state. If a message having a nonzero value in the MORE_PAGES field is received at the end of the active slot, the receiver may remain in the active state into the slot following the assigned slot. It is preferred that the receiver remain in the active state no longer than two slots so that the receiver does not waste power by being active. This is in case the message containing a MORE_PAGES field equal to "0" was received in error and discarded.

In FIG. 2d, message 66 has a nonzero value of "1" in MORE_PAGES field 98. Therefore, the receiver remains in the active state to receive message 64, which has a nonzero value of "1" in MORE_PAGES field 100. The receiver remains in the active state to receive message 62, which has a nonzero value in MORE_PAGES field 96. Similarly, the receiver remains active to receive message 60, which occurs at the end of the active slot 70. The receiver remains in the active state after slot 99 reaches arrow 72 because MORE_PAGES field 101 of message 60 has a nonzero value of "1." The receiver receives message 102 at the beginning of slot 99. The receiver may enter the inactive state after receiving message 102 because MORE_PAGES field 104 of message 102 has a value of "0."

Figure 5A:
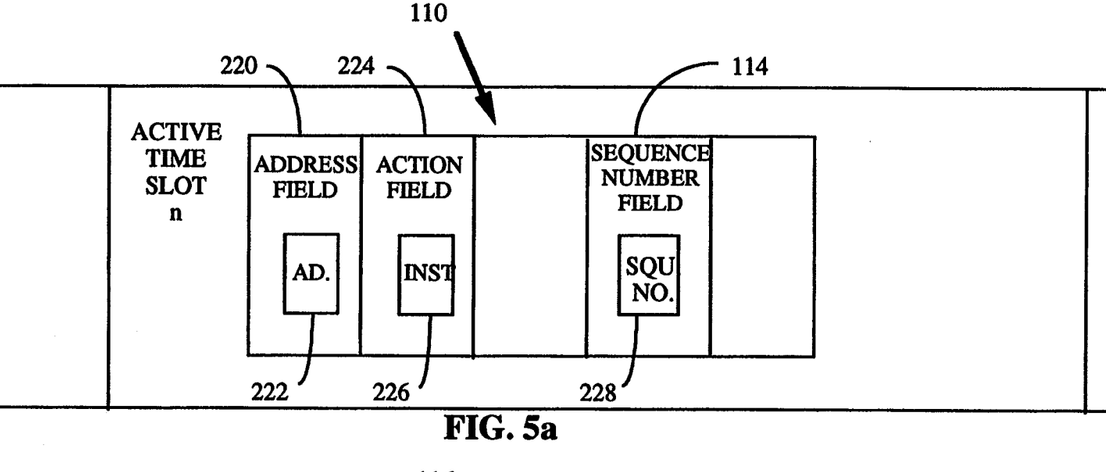

Messages may include an address field having the ESN of the receiver and one or more action fields instructing the receiver to perform other actions. The receiver performs any actions that occur in messages having the receiver's ESN. Alternatively, the addressing function may be performed by the transmitter sending the phone number. In this case, the receiver performs any actions that occur in messages having a phone number assigned to the receiver. These actions may direct the receiver to remain active to receive additional messages. Since the receiver now receives all slots, these messages can be sent at any time. The actions may direct a receiver to become active for a while and then enter the slotted mode of operation. In FIG. 5a, the receiver (not shown) receives a message 110 during active slot 112 of slot cycle "n." Message 110 has an address field 220, which contains an address 222. Message 110 also has an action field 224, which contains an instruction 226. If address 222 corresponds to the ESN of the receiver, the receiver performs instruction 226.

Instruction 226 may direct the mobile station to update system parameters or "overhead" information. A message directing the mobile station to update the overhead information may also have one or more fields containing "sequence numbers." The receiver reads the sequence number contained in each such field and stores the value. When the next message containing such a sequence number is received during the next slot cycle, the receiver reads the sequence number in each sequence number field and compares them to the corresponding sequence numbers that were previously stored, usually during the previous slot cycle. If any of the sequence numbers have changed, the receiver provides an indication to the processor in the mobile station with which it is associated to update the overhead information.

Figure 5B:
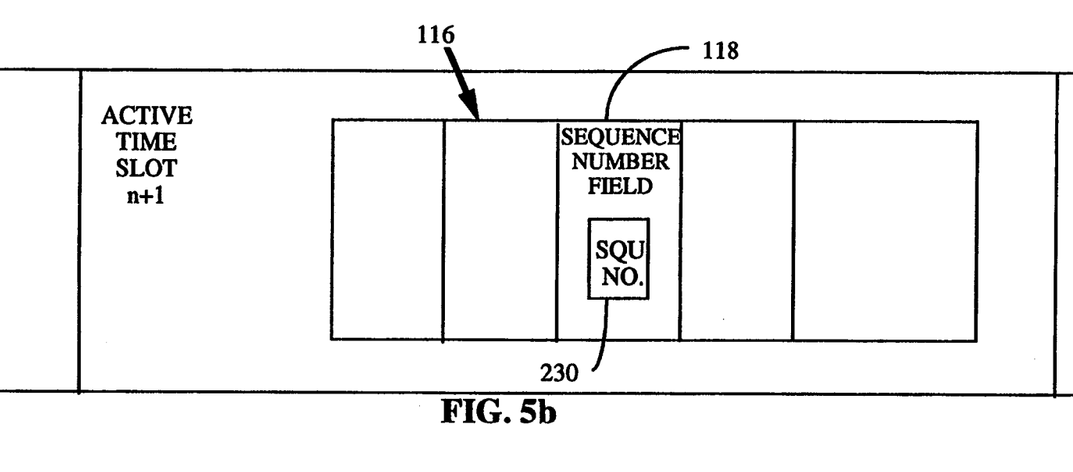

In FIG. 5a, the message has sequence number field 114, which contains a sequence number 228. The receiver stores sequence number 228 in a location corresponding to the sequence number field 114. FIG. 5b represents the next slot cycle, slot cycle "n+1." The receiver receives a message 116 during active slot 112, which contains sequence number 230 in sequence number field 118. Sequence number field 118 corresponds to sequence number field 114 of message 110 received during the previous slot cycle. The receiver compares sequence numbers 228 and 230 and, if different, provides an indication to the processor (not shown) that the mobile station is to remain in the active state. The receiver may then wait for additional messages having the new overhead information or perform any other action as directed by the processor. The receiver need not perform any additional action if the values in corresponding sequence number fields of messages received in successive slot cycles remain unchanged.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

We claim:

1. A method for conserving power in a mobile station consuming power at an average rate that receives information from a base station, by dividing all time into periodic segments of time, each segment of which is comprised of a fixed number of time slots, and by scheduling communication from said base station to said mobile station during at least one time slot within each segment of said periodic segments, comprising the steps of:

providing to said base station by said mobile station a notification of the identity of said mobile station;

providing to said base station by said mobile station an index number representing a quantity of slots during which communication is possible within each of said periodic segments;

determining at said base station an assigned slot within said fixed number of time slots within each segment based on the identity of said mobile station;

determining at said base station a set of active time slots within each segment of said periodic segments wherein said set of active time slots comprises said quantity of slots during which communication is possible and wherein said set of active time slots is evenly spaced in time within said periodic segments and wherein one slot of said set of active time slots is said assigned slot; and reducing said average power consumption rate of said mobile station in said fixed number of time slots other than said set of active time slots.

2. The method of claim 1 further comprising the steps of:

receiving by said mobile station during a particular time slot of said set of active time slots a message from said base station wherein said message indicates that there are no more pertinent messages corresponding to said particular time slot; and reducing said average power consumption rate of said mobile station in response to said message.

3. The method of claim 1 wherein each message received during a particular time slot of said set of active time slots indicates that there is at least one more message corresponding to said particular time slot further comprising the step of reducing said average power consumption rate of said mobile station autonomously at the end of the time slot following said particular time slot.

4. The method of claim 1 further comprising the steps of:

receiving by said mobile station during a particular time slot a message intended for said mobile station from said base station; and acting according to the information of said message.

5. The method of claim 1 further comprising the steps of:

storing by said mobile station an indication of system overhead information;

providing by said base station an updated indication of said system overhead information in a time slot corresponding to a particular active time slot of said mobile station;

receiving at said mobile station said updated indication; and comparing said updated indication to said stored indication.

6. The method of claim 5 further comprising the steps of:

storing by said mobile station said updated indication when said updated indication is different from said stored indication; and remaining available to receive messages from said base station in the time slot following said particular active time slot.

7. The method of claim 1 wherein said step of determining said assigned slot comprises the step of calculating a predetermined function dependent on said identity of said mobile station wherein said predetermined function is a hash function that provides a number equal to or less than said fixed number of time slots.

8. The method of claim 7 wherein said identity of said mobile station comprises an identifying number having 32 binary bits, and wherein said hash function is defined by:

$$\lfloor F \times ((40503 \times (L \oplus H \oplus D)) \bmod 2^{16})/2^{16} \rfloor$$

where:

F is said fixed number of time slots;

L is the least significant 16 bits of said identifying number;

H is the most significant 16 bits of said identifying number;

D is a number 6 times the least significant 12 bits of said identifying number;

the symbols $\lfloor$ $\rfloor$ represent the largest integer less than or equal to the number contained within the symbols;

$\oplus$ represents a bit-wise exclusive-OR operation; and all other operations are integer arithmetic.

9. The method of claim 1 wherein said step of reducing said average power consumption rate comprises the step of reducing the current consumption of at least one component used for receiving messages from said base station.

10. The method of claim 1 further comprising the steps of:

sending to said base station by said mobile station an updated index number representing a new quantity of slots during which communication is possible;

sending by said base station an acknowledgment of a successful receipt of said updated index number; and determining at said base station a new set of active time slots within each segment of said periodic segments wherein said new set of active time slots comprises said new quantity of slots during which communication is possible and wherein said new set of active time slots is evenly spaced in time in said periodic segments and wherein one slot of said new set of active time slots is said assigned slot.

11. The method of claim 10, wherein said new quantity of slots is larger than said quantity of slots, further comprising the step of failing to receive at said mobile station said acknowledgment wherein said scheduled communication continues from base station to said mobile station on said set of active time slots.

12. The method of claim 10, wherein said quantity of slots is larger than said new quantity of slots, further comprising the step of failing to receive at mobile station said acknowledgment wherein said scheduled communication continues from base station to said mobile station on said new set of active time slots.

13. The method of claim 1 wherein said scheduled communication uses a spread spectrum communication signal.

14. The method of claim 1 wherein said base station transmits a pilot signal containing an indication of an occurrence of said time slots and said mobile station uses said pilot signal to synchronize said scheduled communications.

15. The method of claim 1 wherein said identity of said mobile station is an electronic serial number unique to said mobile station.

16. The method of claim 1 wherein said identity reflects a phone number of said mobile station.

17. The method of claim 5 wherein said indication of said system overhead information comprises a sequence number.

18. The method of claim 5 wherein said step of comparing indicates the currentness of a set of stored system parameters.

19. A communication system for transferring messages from a central base station to one or more of a plurality of mobile stations, each mobile station consuming power, comprising:

means for receiving at said base station a message intended for a particular mobile station;

means for selecting a set of active time slots at said base station during which to transfer said message, said set of active time slots based on the identity of said particular mobile station and an index number received from said particular mobile station;

means for transmitting said message from said base station during one time slot of said set of active time slots;

means for receiving said message at said particular mobile station; and means for reducing said power consumption of said particular mobile station in said plurality of time slots other than said set of active time slots.

20. The system of claim 19 further comprising means for generating said set of active time slots at said particular mobile station.

21. The system of claim 20 wherein a termination message is received at said particular mobile station indicating that said termination message is the last message to be transmitted in the current time slot and wherein said particular mobile station reduces said power consumption of said particular mobile station in response thereto.

22. The system of claim 19 wherein said message is transmitted as a spread spectrum signal.

23. The system of claim 19 wherein said message is transmitted as a code division multiple access spread spectrum signal.

24. The system of claim 19 wherein said identity of said particular mobile station comprises an electronic serial number.

25. The system of claim 19 wherein said identity of said particular mobile station comprises a telephone number of said mobile station.

26. The system of claim 19 wherein said set of active time slots are evenly spaced in time.

27. The system of claim 19 further comprising means for generating a pilot signal at said base station for synchronizing communication from said base stations to said plurality of mobile stations.

28. The system of claim 27 further comprising means for generating said set of active time slots at said particular mobile station.

29. A method for conserving power in a cellular telephone having an average power consumption that is not currently involved in a telephone call by using periodic intervals of time, wherein each interval is comprised of a fixed number of time slots, and by scheduling communication from a base station to said cellular telephone during at least one time slot within each of said periodic intervals, comprising the steps of:

identifying said cellular telephone to said base station;

determining at said base station a set of active time slots within each interval wherein said set of active time slots comprises a quantity of time slots during which said base station may transmit messages to said cellular telephone; and reducing said average power consumption of said cellular telephone during said fixed number of time slots other than said set of active time slots.

30. The method of claim 29 further comprising the step of providing to said base station by said cellular telephone a representation of a quantity of slots during which communication is possible within each of said periodic intervals and wherein said step of determining said active time slots bases said quantity of active time slot on said representation.

31. The method of claim 29 further comprising the step of determining at said base station an assigned slot within said fixed number of time slots within each interval, wherein one slot of said set of active time slots is said assigned slot.

32. The method of claim 31 wherein said set of active time slots is evenly spaced in time within said periodic intervals.

33. The method of claim 31 wherein said step of determining said assigned slot comprises the step of calculating a predetermined function dependent on the identity of said cellular telephone wherein said predetermined function is a hash function that provides a number equal to or less than said fixed number of time slots.

34. The method of claim 31 wherein the identity of said cellular telephone comprises an identifying number having 32 binary bits, and wherein said assigned slot is determined by a function defined by:

$$\lfloor Fx((40503x(L \oplus H \oplus D)) \bmod 2^{16})/2^{16} \rfloor$$

wherein:
F is said fixed number of time slots;
L is the least significant 16 bits of said identifying number;
H is the most significant 16 bits of said identifying number;
D is a number 6 times the least significant 12 bits of said identifying number;
the symbols $\rfloor$ $\lfloor$ represent the largest integer lass than or equal to the number contained within the symbols;
$\oplus$ represents a bit-wise exclusive-OR operation; and
all other operations are integer arithmetic.

35. The method of claim 29 wherein said step of reducing the average power consumption comprises the step of removing power from at least one component used for receiving messages from said base station.

36. The method of claim 29 wherein said step of reducing the average power consumption comprises the step of reducing the current consumption of at least one component.

37. The method of claim 29 further comprising the steps of:
receiving by said cellular telephone during a particular time slot of said active set a message from said base station wherein said message indicates that there are no more pertinent messages corresponding to said particular time slot.
reducing the power consumption of said cellular telephone in response to said message.

38. The method of claim 29 wherein each message received during a particular time slot of said set of active time slots indicates that there is at least one more message corresonding to said particular time slot further comprising the step of reducing the power consumption to said cellular telephone autonomously at the end of the time slot following said particular time slot.

39. The method of claim 29 further comprising the steps of:
receiving by said cellular telephone during a particular time slot a message intended for said cellular telephone from said base station; and
acting at said cellular telephone in accordance to the information of said message.

40. The method of claim 29 further comprising the steps of:
storing by said cellular telephone an indication of system information;
providing by said base station an updated indication of said system information in a time slot corresponding to a particular active time slot of said cellular telephone;
receiving at said cellular telephone said updated indication; and
comparing at said cellular telephone said updated indication to said stored indication.

41. The method of claim 40 wherein said indication of said system information comprises a sequence number.

42. The method of claim 40 wherein said step of comparing indicates the currentness of a set of stored system parameters.

43. The method of claim 40 further comprising the steps of:
storing by said cellular telephone said updated indication when said updated indication is different from said stored indication; and
remaining available to receive messages from said base station in the time slot following said particular active time slot.

44. The method of claim 29 further comprising the steps of:
sending to said base station by said cellular telephone an index number representing a quantity of slots during which communication is possible;
sending by said base station an acknowledgment of a successful receipt of said index number; and
determining at said base station a new set of active time slots within each interval of said periodic intervals wherein said new set of active time slots comprises said new quantity of time slots during which communication is possible.

45. The method of claim 29 wherein said scheduled communication uses a spread spectrum communication signal.

46. The method of claim 29 further comprising the steps of:
transmitting from said base station a pilot signal containing an indication of an occurrence of said time slots; and
using said pilot signal at said cellular telephone to synchronize said scheduled communications.

47. The method of claim 29 wherein the identity of said cellular telephone is an electronic serial number unique to said cellular telephone.

48. The method of claim 29 wherein the identity reflects a phone number of said cellular telephone.

* * * * *